(12) United States Patent
Yamaga et al.

(10) Patent No.: US 8,257,874 B2
(45) Date of Patent: Sep. 4, 2012

(54) FUEL CELL WITH COOLING METHOD AT START UP

(75) Inventors: Kenji Yamaga, Hitachi (JP); Hironori Sasaki, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 12/910,939

(22) Filed: Oct. 25, 2010

(65) Prior Publication Data

US 2011/0039177 A1 Feb. 17, 2011

Related U.S. Application Data

(62) Division of application No. 11/527,480, filed on Sep. 27, 2006, now abandoned.

(30) Foreign Application Priority Data

Mar. 30, 2006 (JP) .................................. 2006-092740

(51) Int. Cl.
  *H01M 8/04* (2006.01)
(52) U.S. Cl. ........ 429/429; 429/430; 429/431; 429/432; 429/442
(58) Field of Classification Search .......... 429/429–433, 429/442
See application file for complete search history.

(56) References Cited

U.S. PATENT DOCUMENTS 6,186,254 B1 * 2/2001 Mufford et al. ............... 429/442
2002/0182467 A1 * 12/2002 Ballantine et al. ............. 429/26

FOREIGN PATENT DOCUMENTS

JP 2005-190744 7/2005

* cited by examiner

*Primary Examiner* — Keith Walker
(74) *Attorney, Agent, or Firm* — Antonelli, Terry, Stout & Kraus, LLP.

(57) ABSTRACT

The fuel cell system includes a fuel cell stack, a fuel cell temperature sensor for measuring the internal temperature of the fuel cell, a voltage sensor for measuring the power generation voltage of the fuel cell, a current sensor for measuring the current flowing from the fuel cell, a radiator for radiating heat generated by the fuel cell, a fan attached to the radiator for controlling the heat radiation amount, a cooling water pump for increasing the pressure of a cooling fluid, a bypass valve for controlling the cooling fluid amount entering the radiator, and a controller, on the basis of the voltage information measured by the voltage sensor, the temperature information measured by the temperature sensor, and the current information measured by the current sensor, for controlling at least one of the operation amount of the cooling water pump, the operation amount of the fan, and the cooling fluid amount flowing through the bypass valve.

7 Claims, 3 Drawing Sheets

FUEL CELL WITH COOLING METHOD AT START UP

CLAIM OF PRIORITY

This application is a divisional of Application Ser. No. 11/527,480, filed on Sep. 27, 2006 now abandoned, which claims the benefit of Japanese Application No. 2006-092740, filed on Mar. 30, 2006, in the Japanese Patent Office, the disclosures of which are incorporated herein by reference.

BACKGROUND OF THE INVENTION

1. Field of the Invention

The present invention relates to a power generation system using a fuel cell.

2. Description of the Prior Art

A fuel cell is an electrochemical device for converting fuel energy directly to electric energy by an electrochemical reaction. The fuel cell, depending on a charge carrier used, is broadly divided into a phosphoric fuel cell, a melt carbonate fuel cell, a solid oxide fuel cell, a polymer electrolyte fuel cell (hereinafter, abbreviated to PEFC), and an alkaline fuel cell.

Among these various fuel cells, the PEFC enables high current density power generation and operation at a comparatively low temperature, so that applications to various uses including a power source for a mobile body are anticipated.

For an electrolyte of the PEFC, an ion exchange membrane with a thickness of several tens μm to hundred and several tens μm is used. The ion exchange membrane has a general structure that a side chain having the sulfonic group is bonded to fluorocarbon composing a main chain. The ion exchange membrane has proton conductivity, thus the membrane material is required to contain moisture. The reason is that the sulfonic group takes a cluster structure in the material, and the clusters are connected by a channel, and by conduction of protons ($H_3O^+$) in the channel, the material shows proton conductivity, though to follow this mechanism, existence of water is necessary.

Therefore, when operating the PEFC, a system that gas to be supplied contains moisture for moistening the electrolyte is general. When the PEFC generates power, it generates water by the chemical reaction thereof. If collected generated water can be used as moistening water, a system requiring no feed water from the outside can be formed and the constituent devices can be simplified.

When the constituent devices can be simplified, not only the manufacturing cost can be reduced but also the system volume can be made smaller, and particularly when the PEFC is used as a power source for a mobile body, the advantage is increased.

To improve the operability of the fuel cell system, it is preferable to realize a rapid start characteristic.

To start the system at high speed, it is necessary to promptly increase the cell temperature to a preset temperature. When separately installing a heater mechanism for increasing the temperature of the cell, it is extremely inefficient in respect of efficiency and volume, so that it is generally difficult to load it in a power source for a mobile body. Therefore, in a system having no special cell temperature rise mechanism, as a heat source for increasing the temperature of the cell, heat generated by power generation is used. To form the fuel cell, several hundreds separators are generally used as one of the main materials. When using carbon separators comparatively thick such as several mm or more, the fuel cell is long in the lamination direction. Simultaneously, in correspondence to an increase in the stack volume, the heat capacity also increases. Namely, the temperature rise speed at time of power generation is low and rapid start is difficult.

Improvement of the start characteristic at low temperature is described in Japanese Patent Laid-open No. 2005-190744.

SUMMARY OF THE INVENTION

The present invention proposes a fuel cell system having an excellent start characteristic.

The fuel cell system includes:
a fuel cell stack, a fuel cell temperature sensor for measuring the internal temperature of the fuel cell, a voltage sensor for measuring the power generation voltage of the fuel cell,
a current sensor for measuring the current flowing from the fuel cell,
a radiator for radiating heat generated by the fuel cell, a fan attached to the radiator for controlling the heat radiation amount,
a cooling water pump for increasing the pressure of a cooling fluid,
a bypass valve for controlling the cooling fluid amount entering the radiator, and
a controller, on the basis of the voltage information measured by the voltage sensor, the temperature information measured by the temperature sensor, and the current information measured by the current sensor, for controlling at least one of the operation amount of the cooling water pump, the operation amount of the fan, and the cooling fluid amount flowing through the bypass valve.

According to the present invention, a fuel cell system having an excellent start characteristic can be provided.

DESCRIPTION OF THE PREFERRED EMBODIMENTS

Figure 1:
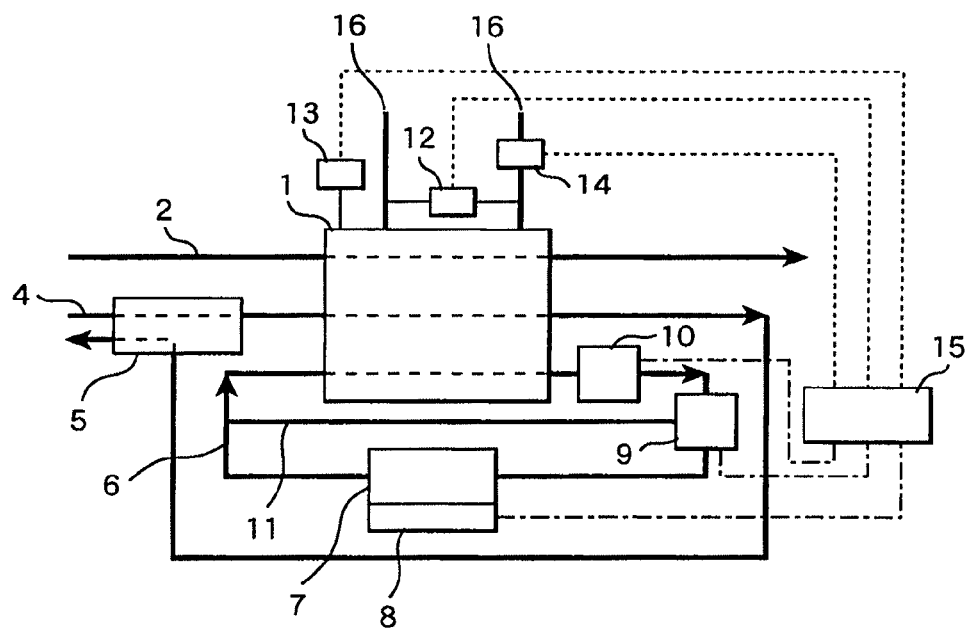
FIG. 1 is a drawing showing a part of the power generation system configuration of Embodiment 1 relating to the present invention.

The embodiments relating to the present invention will be explained.

Firstly, a fuel cell system including a fuel cell stack formed by using a metallic material for separators, a fuel cell temperature sensor for measuring the internal temperature of the fuel cell, a voltage sensor for measuring the power generation voltage of the fuel cell, a current sensor for measuring the current flowing from the fuel cell, a radiator for radiating heat generated by the fuel cell, a fan attached to the radiator for controlling the heat radiation amount, a cooling water pump for increasing the pressure of a cooling fluid, a bypass portion for controlling the cooling fluid amount entering the radiator, a cathode line having an arranged moistening device for adding water generated by power generation to air, an anode line for supplying hydrogen, and a controller for controlling the auxiliary device operation in the system, wherein the controller judges on the basis of the voltage information measured by the voltage sensor, the temperature information measured by the temperature sensor, and the current information measured by the current sensor, thereby controls the cooling fluid amount flowing through the cooling water pump, fan, and bypass portion is proposed.

The fuel cell has a characteristic that due to the property of the electrolytic membrane, when moisture in the cell is reduced, the cell performance is lowered. Even at start time when the temperature is changed particularly terribly, by use of a system having the aforementioned constitution, the cell temperature can be controlled finely, and the vapor pressure in the cell is controlled, thus the cell characteristic can be stabilized without excessively reducing moisture in the electrolytic membrane.

Secondly, a system that the controller, when the displacement amount dV/dt of the fuel cell stack voltage V to the time t is smaller than 0, and the displacement amount dT/dt of the fuel cell stack temperature T to the time t is larger than 0, and the displacement amount dI/dt of the fuel cell stack current I to the time t is equal to or larger than 0, changes the cooling fluid amount flowing through the cooling water pump, fan, and bypass portion, and controls the quantity of heat discharged externally from the fuel cell so as to increase is proposed.

As an embodiment, the controller increases at least one of the operation amount of the cooling water pump, the operation amount of the fan, and the ratio of the cooling flow rate flowing to the radiator to the cooling flow rate flowing through the bypass valve.

By use of this control method, the temperature is controlled at the very early timing when the internal drying condition of the cell affects the cell characteristic, and the moisture content in the cell can be controlled, so that particularly even when the cell temperature is changed greatly at start time, the cell characteristic is hardly lowered and the cell behavior is stabilized.

Furthermore, thirdly, when the displacement amount dV/dt of the fuel cell stack voltage V to the time t is larger than 0 and the displacement amount dT/dt of the fuel cell stack temperature T to the time t is smaller than 0, it is proposed to control the cooling fluid amount flowing through the cooling water pump, fan, and bypass portion. By use of this method, the cell temperature is judged to be lowered as required, and the cooling effect is regulated by changes in the operation amounts of the pump and fan, thus without unnecessarily lowering the cell temperature, that is, without generating condensed water causing flooding, minimal cooling necessary for stabilization of the cell performance is executed, thus the system can be started at high speed.

As an embodiment, the controller decreases at least one of the operation amount of the cooling water pump, the operation amount of the fan, and the ratio of the cooling flow rate flowing to the radiator to the cooling fluid amount flowing through the bypass valve.

Furthermore, fourthly, to the set value Tc of the stack temperature at time of rated power generation, when the present time T is within the range of T<Tc−5, it is proposed to drive repeatedly the operation of the cooling section.

At start time, it is natural that the stack and auxiliary device are greatly changed in temperature, though when power is generated under the rated condition and then power is generated under the partial load condition, the heat value is reduced, so that the temperature set by Tc cannot be maintained, and the stack temperature lowers. Furthermore, thereafter, when power is generated again under the rated condition, the stack temperature rises greatly, so that the condition coincides with the condition at start time. By this proposal, not only at start time but also in correspondence to sudden temperature change of the stack due to change in the power generation condition, the cell can be operated stably.

In a system using a self moistening method using generated water accompanying power generation of the fuel cell, immediately after start, the collection amount of generated water is small, and self moistening is not executed sufficiently, so that the cell performance may be lowered or may become unstable. According to the embodiment of the present invention, even a fuel cell power generation system using the moistening method for collecting generated water at time of power generation and adding it to gas to be supplied can be started in a short time and can perform an operation at a stable power generation voltage.

Hereinafter, the embodiment of the present invention will be explained with reference to the accompanying drawings.

Embodiment 1

The basic constitution of the power generation cell is that around an electrode electrolytic membrane composed of perfluorocarbon sulfonic acid based electrolytic membrane and an electrode having a catalyst of platinum particles carried by a carbon carrier as a main component which are united with each other, on the front and rear surfaces thereof, a cathode diffusion layer and an anode diffusion layer which are carbon paper that polytetrafluoroethylene (PTFE) is dispersed on the surface and the water repellency is controlled are arranged, and furthermore metallic separators are arranged on both sided thereof. By combining 120 power generation cells and 60 cooling cells for passing cooling water and lowering the cell temperature, one stack is prepared.

The cooling line including an anode line 2 for supplying hydrogen, a cathode line 4 having a moistening device 5 composed of a water penetration membrane for collecting generated water and moistening, a cooling water pump 10 for sending cooling water, a radiator 7 with a fan 8 attached, a bypass portion 11, and a bypass valve 9 for controlling the flow rate thereof is connected to a stack 1. To an output line 16 taking out output from the stack 1, a current sensor 14 is attached. To measure the voltage of the cell composing the stack, a voltage sensor 12 is connected to a separator for each 10 cells. A temperature sensor 13 is arranged at the central part of the electrode almost at the central position of the stack so as to detect the maximum temperature in the stack during power generation. Here, the voltage sensor 12 measures the voltage of all 10 cells together. However, even if all the cells are measured individually and even if more than 10 cells, for example, 20 or more cells are measured together, no problems are imposed. Each sensor information is connected to a controller 15 and the controller 15, on the basis of the information from the sensors, controls the operations and operation amounts of the cooling water pump, bypass valve, and fan. The block diagram of this system is shown in FIG. 1.

The operation instruction contents of the controller 15 are indicated below.

When the displacement amount dV/dt of the stack voltage V when the power generation is started to the time t is smaller than 0, and the displacement amount dT/dt of the stack temperature T to the time t is larger than 0, and the displacement amount dI/dt of the stack current I to the time t is equal to or larger than 0, the operation or operation amount of the cooling water pump is increased to increase the sending amount of cooling water, and when the displacement amount dV/dt of the stack voltage V to the time t is larger than 0 and the displacement amount dT/dt of the stack temperature T to the time t is smaller than 0, the cooling water pump 10 is stopped or the operation amount thereof is lowered to reduce the sending amount of cooling water.

Further, when the set value TC of the stack temperature at time of rated power generation is set to 70° C. and on the other hand, the present temperature T is 65° C., it is set to execute temperature control only by the operation of the fan.

The aforementioned contents are stored in the controller, and when the stack temperature is equal to the room temperature, hydrogen controlled at a fixed pressure of 45 kPa and air of 250 L/min are supplied, and when it is confirmed that the stack voltage increases to 110 V or higher, a rated current load of 55 A is added, and the system is started. The current is kept constant, and assuming the moment the current starts to flow as t1, the time after t1, stack voltage, and stack temperature are measured. Further, at the point of time when the current starts to flow, no cooling operation is performed.

Comparison Example 1

Figure 2:
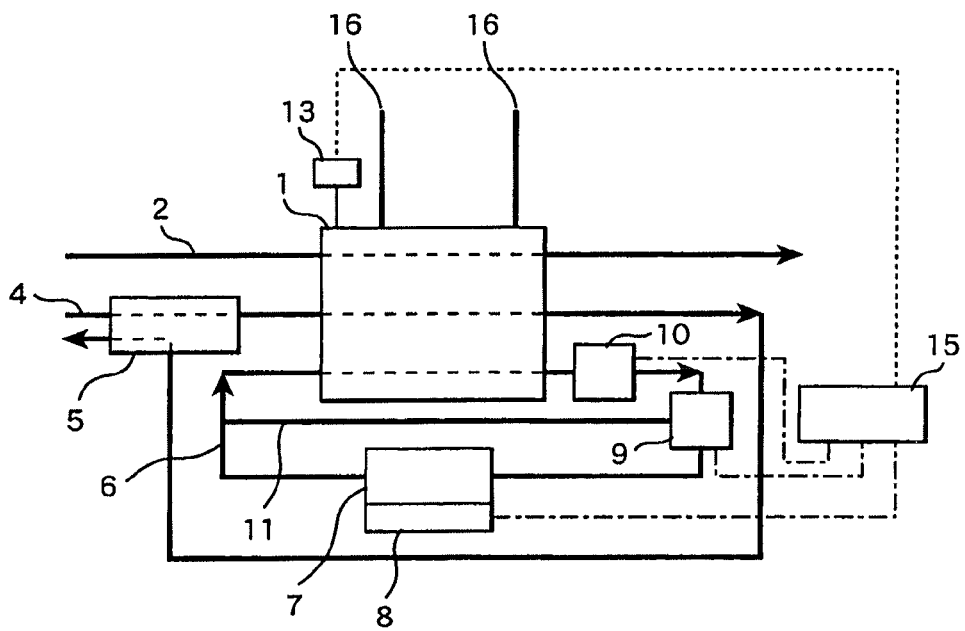
FIG. 2 is a drawing showing a part of the power generation system configuration of Comparison Examples 1 and 2 relating to the present invention.

The system constitution of Comparison Example 1 is shown in FIG. 2. Comparison Example 1 has an almost similar constitution to that of Embodiment 1, though the controller 15 for controlling the cooling water pump, bypass valve, and fan judges on the basis of the stack temperature T measured by the temperature sensor and controls the operation and operation amount thereof.

For the system of Comparison Example 1, the power generation test is executed according to the same contents as those of Embodiment 1.

Comparison Example 2

Comparison Example 2 has the same constitution as that of Comparison Example 1 and a system in which the control method for increasing the stack temperature up to the set operation temperature TC at a predetermined temperature rise rate at start time is stored in the controller 15 is used as Comparison Example 2.

For the system of Comparison Example 2, the power generation test is executed according to the same contents as those of Embodiment 1. The predetermined temperature rise rate used in the power generation test of Comparison Example 2 is set to the same value as the time required for Embodiment 1 from the start up to the temperature TC.

Figure 3:
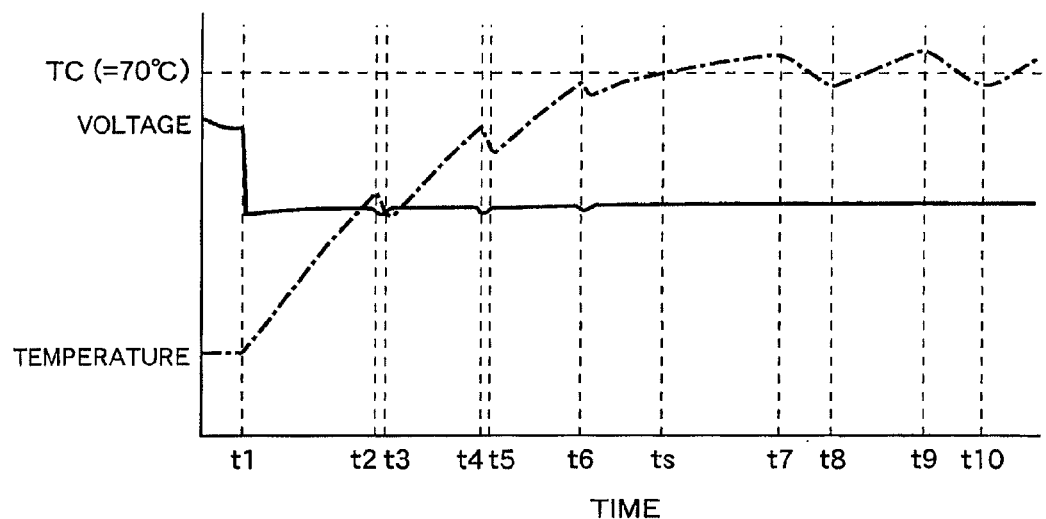
FIG. 3 is a drawing showing the power generation test results at start time of Embodiment 1 relating to the present invention.

FIG. 3 shows the relationship between the stack voltage and the time at start time when the power generation test is executed using the system of Embodiment 1. The point of time when hydrogen and air are supplied to the system of Embodiment 1 and the rated load is applied to it is t1 and at this time, the voltage is lowered according to the current due to various resistance components. Further, due to generation of heat accompanying start of power generation, the stack temperature rises slowly. At t2, the stack voltage is lowered from the preceding one, so that the controller judges that due to a cell temperature rise accompanying power generation, the relative humidity in the stack is lowered and it starts cooling to wet the electrolytic membrane. At t3, the voltage increases due to the effect of cooling, so that the controller judges that a minimum cooling step is completed and it stops cooling. Between t2 and t3 during which the cooling is executed, it can be confirmed that the stack temperature is also lowered. The interval between t3 and t4 is a time zone that the temperature rises again due to generation of heat and at the point of time when the stack voltage is lowered at t4, the cooling is restarted by the judgment of the controller. As a result, the stack temperature is lowered, and the controller detects an increase of the stack voltage at t5, thereby stops the cooling operation. At t6, the controller repeats the similar control, though at this point of time, the temperature approaches sufficiently the set value of the power generation temperature, and the cooling water temperature also increases, so that at t6 and thereafter, even if the stack voltage increases, the cooling operation is executed continuously. At the time ts, the temperature reaches the set temperature TC. In this experiment, the interval between t1 and ts is 480 seconds. The stack temperature rises furthermore and at t7, the operation to lower the water temperature, in this constitution, the fan installed on the radiator starts operation. At t8, the fan continues the operation up to the point of time when the temperature is lowered sufficiently and thereafter, this process is repeated.

Figure 4:
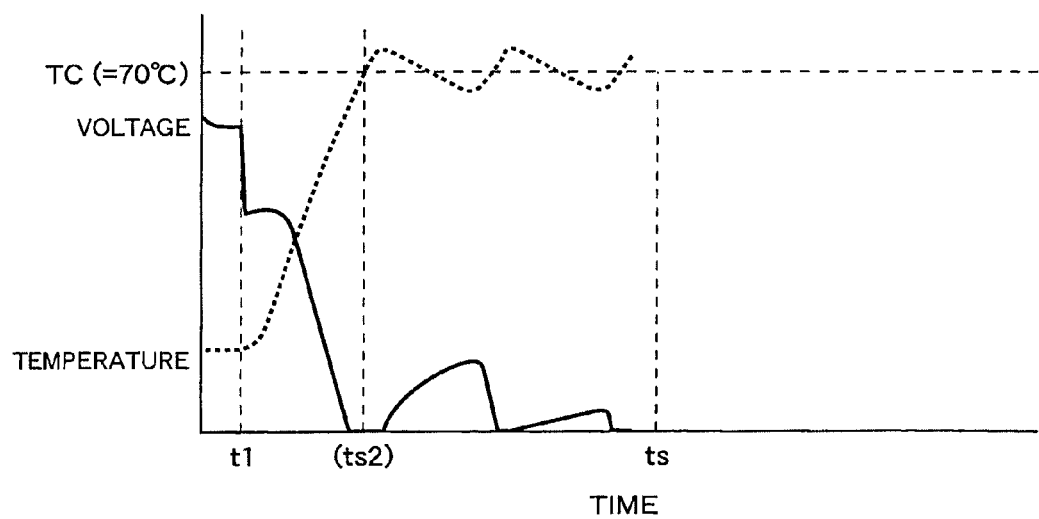
FIG. 4 is a drawing showing the power generation test results at start time of Comparison Example 1 relating to the present invention.

In FIG. 4, the start data when the power generation test is executed using the system of Comparison Example 1 is shown. Comparison Example 1 is a control method for taking in temperature information and increasing the temperature up to the set temperature in a shortest time, so that the arrival time (from t1 to ts2) from start to TC (70° C.) is 175 seconds and the temperature can be raised rapidly. However, during this period, moisture supply corresponding to the cell temperature rise is insufficient, so that the relative humidity in the cell is lowered greatly. Thereby, it seems that moisture in the electrolytic membrane is taken away outside the cell system, and the cell voltage is lowered greatly to zero or below it. When the temperature rises to 70° C. or higher, the cooling operation is started, and the stack temperature is also lowered, and the voltage is recovered temporarily, though in the situation of temperature rise, the voltage is lowered again to zero or below it. Namely, in Comparison Example 1, the rising time to the set temperature is short, though the power generation cannot be continued.

Figure 5:
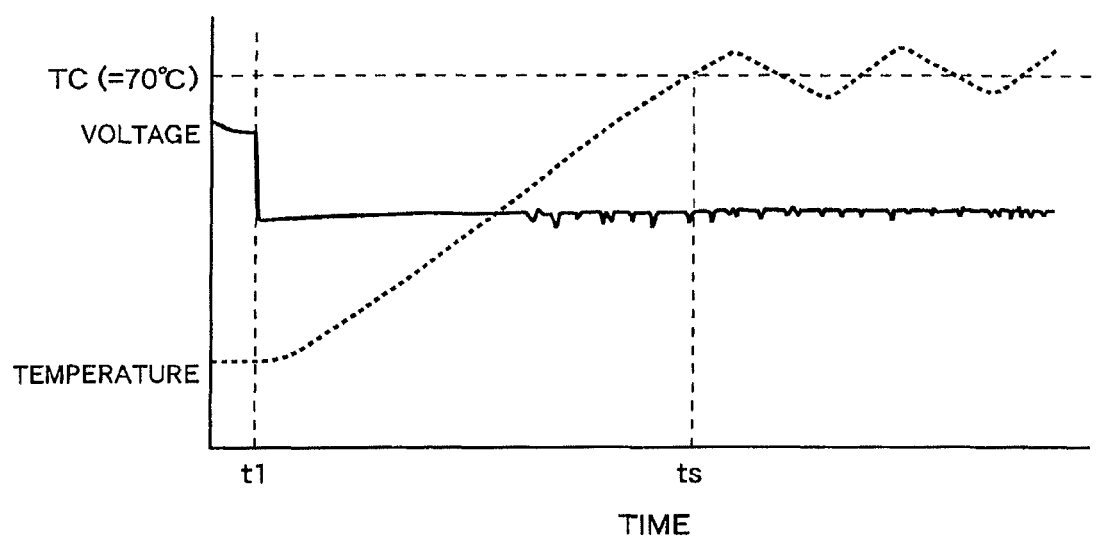
FIG. 5 is a drawing showing the power generation test results at start time of Comparison Example 2 relating to the present invention.

In FIG. 5, the start data when the power generation test is executed using the system of Comparison Example 2 is shown. In Comparison Example 2, the cooling system operation is controlled so as to keep the temperature rise rate constant from start, thus the time is required to reach the power generation set temperature is 480 seconds similarly to Embodiment 1. However, in Comparison Example 2, as time elapses, the voltage is changed little by little. The reason is that the cell temperature is suppressed excessively by cooling, so that moistening water or generated water is condensed in the cell, and reaction gas is prevented from diffusion, thus the voltage of several single cells composing the fuel cell is lowered greatly. Namely, in Comparison Example 2, although the start time is the same as that of Embodiment 1, it cannot be said that the power generation stability is sufficient and the start characteristic is not satisfactory.

From the above-mentioned, in Embodiment 1 in which the system constitution and control of this proposal are executed, it is proved that regardless of the simple system constitution, the start time from the stop state to the set temperature can be shortened, and the stability of the power generation voltage during the period is high, and the start characteristic is excellent.

What is claimed is:

1. An operating method of a fuel cell system comprising a fuel cell stack, a fuel cell temperature sensor, a voltage sensor, a current sensor, a radiator, a fan, a cooling water pump and a bypass valve, the method comprising:

measuring an internal temperature of said fuel cell with the fuel cell temperature sensor;

measuring a power generation voltage of said fuel cell with the voltage sensor;

measuring a current flowing from said fuel cell with the current sensor; and controlling, on the basis of voltage information measured by said voltage sensor, temperature information measured by said temperature sensor, and current information measured by said current sensor, at least one of an operation amount of said cooling water pump, an operation amount of said fan, and a cooling fluid amount flowing through said bypass valve;

at the time of starting of said fuel cell system, when a displacement amount dV/dt of a fuel cell stack voltage V to time t is smaller than 0, a displacement amount dT/dt of a fuel cell stack temperature T to the time t is larger than 0, and a displacement amount dI/dt of a fuel cell stack current I to the time t is equal to or larger than 0, changing at least one of said operation amount of said cooling water pump, said operation amount of said fan, and said cooling fluid amount flowing through said bypass valve to increase a quantity of heat discharged externally from said fuel cell; and when the displacement amount dV/dt of the fuel cell stack voltage V to time t is equal to or larger than 0, stopping the cooling operation by using said cooling water pump, said by pass valve, and said fan.

2. A starting method for a fuel cell system comprising:

a fuel cell;

a fuel cell stack has a fuel cell;

a temperature sensor measures the temperature of said fuel cell stack;

a voltage sensor measures the voltage of said fuel cell;

a cooling system cools said fuel cell; and a controller controls said cooling system: wherein, said controller has a first control mode which stops said cooling system when the displacement amount dT/dt of the temperature T measured by said temperature sensor is larger than 0, and the displacement amount dV/dt of the voltage V measured by said voltage sensor is more than 0, and said controller has a second control mode which starts said cooling system to cool said fuel cell when the dT/dt is larger than 0, and the dV/dt is smaller than 0.

3. The starting method for the fuel cell system according to claim 2, wherein the first control mode and the second control mode are repeated by the time that the temperature of said fuel cell stack amounts to 65° C., from the starting time of said fuel cell system.

4. The starting method for the fuel cell system according to claim 2, wherein said controller drives said cooling system and continues cooling said fuel cell, after the temperature of said fuel cell stack amounts to 65° C. (Centigrade).

5. The starting method for the fuel cell system according to claim 2, wherein said fuel cell stack has a output line which outputs the electric power generated by said fuel cell stack concerned, and current sensor measures the current which flows into said output line, and the second control mode is performed when fulfilling further the conditions that the displacement amount dI/dt of the current I measured by said current sensor is more than 0.

6. The starting method for the fuel cell system according to claim 2, wherein said cooling system comprises a radiator or a cooling water pump.

7. The starting method for the fuel cell system according to claim 2, wherein said fuel cell is laminated in order of the first metal separator, a cathode diffusion layer, an electrode electrolytic membrane, an anode diffusion layer, and the second metal separator.

* * * * *